US008014757B1

(12) United States Patent
Lim (10) Patent No.: US 8,014,757 B1
(45) Date of Patent: Sep. 6, 2011

(54) SYSTEM AND METHOD FOR ANONYMOUS EXCHANGE OF MULTIMEDIA CONTENT UTILIZING A WIRELESS NETWORK

(75) Inventor: Kevin Lim, Danville, CA (US)

(73) Assignee: Cellco Partnership, Basking Ridge, NJ (US)

( * ) Notice: Subject to any disclaimer, the term of this patent is extended or adjusted under 35 U.S.C. 154(b) by 1876 days.

(21) Appl. No.: 10/859,629

(22) Filed: Jun. 2, 2004

(51) Int. Cl.
*H04L 12/58* (2006.01)

(52) U.S. Cl. ............... 455/412.1; 455/414.1; 455/413; 455/445; 455/466

(58) Field of Classification Search ............... 455/414.1, 455/414.2, 414.3, 414.4, 415, 412.1, 413, 455/455, 466
See application file for complete search history.

(56) References Cited

U.S. PATENT DOCUMENTS

| | | | |
|---|---|---|---|
| 7,120,455 B1 | 10/2006 | Chen et al. | |
| 7,149,537 B1* | 12/2006 | Kupsh et al. | 455/466 |
| 2002/0087641 A1* | 7/2002 | Levosky | 709/206 |
| 2003/0153302 A1* | 8/2003 | Lewis et al. | 455/412 |
| 2004/0102201 A1 | 5/2004 | Levin | |
| 2004/0171396 A1* | 9/2004 | Carey et al. | 455/466 |
| 2004/0203619 A1* | 10/2004 | Tissot | 455/412.1 |
| 2005/0054352 A1* | 3/2005 | Karaizman | 455/456.3 |
| 2005/0141522 A1 | 6/2005 | Kadar et al. | |
| 2005/0174975 A1* | 8/2005 | Mgrdechian et al. | 370/338 |

OTHER PUBLICATIONS

"Help with messages", Upoc, downloaded from: http//www.upoc.com/help_text_msg.jsp on Sep. 25, 2003.
"Let your fingers do the matchmaking", press release from Match.com and AT&T Wireless, dated Feb. 12, 2003.
Match.com, AT&T Wireless Launch Wireless Dating Service, press release dated Feb. 12, 2003.
Find Friends, excerpt from AT&T press release published on or before Feb. 20, 2003.
Online dating's new love: IM, CNET News.com, Nov. 22, 2002.
How to Create MMS Services, Forum Nokia, Version 3.2, Sep. 6, 2002.

* cited by examiner

*Primary Examiner* — Ajit Patel
*Assistant Examiner* — Khai M Nguyen
(74) *Attorney, Agent, or Firm* — McDermott Will & Emery LLP (57) ABSTRACT

A system and method for anonymous exchange of multimedia content over a wireless network. Aliases are associated with users. A user sends a message which includes some non text content to another user by inserting the recipient's alias in the body of the message. The user then indicates a short code of an exchange server as the desired destination of the message. The message is routed to the exchange server through wireless network infrastructure. The exchange server parses the body to obtain the recipient alias. The exchange server then performs a database query to obtain a recipient phone number based on the recipient alias. The exchange server then sends the message to the recipient phone number. Also disclosed is the anonymous sending of messages by using long codes and buddy list indexes. Messages may also be sent or received by an Internet connected user.

17 Claims, 8 Drawing Sheets

SYSTEM AND METHOD FOR ANONYMOUS EXCHANGE OF MULTIMEDIA CONTENT UTILIZING A WIRELESS NETWORK

FIELD OF THE INVENTION

This invention relates generally to the wireless exchange of multimedia content and specifically to anonymous wireless exchange of multimedia content.

BACKGROUND OF THE INVENTION

Dating services, especially online dating services, are increasing in popularity. Online dating services are Internet based services that allow their users to meet for (usually) romantic purposes. Online dating services usually allow a user to store a profile, describing him/her self, to search and look at other users' profiles and to contact other users. Many online dating services allow profiles to include photos, video clips, sound clips, etc. Profiles are usually available over the Internet.

Although online dating services utilize different business models, they usually charge users for the privilege of performing certain actions. Very often users are charged for the ability to contact other users.

Because of the nature of the Internet, the online dating service business is one with a relatively low cost of entry and high competition. For this reason, many online dating services try to add new features, in order to distinguish themselves from their competitors. Another way for an online dating service to distinguish itself from competitors, is by having a large number of users in comparison with competitive services. A large number of users usually means greater choice, and thus a higher probability of a good match for each user trying to locate a suitable match. In order to increase the number of users, online dating services typically improve ease of access, which is very important for users.

One of the most important, but difficult features of an online dating service, is the ability to selectively broadcast information. An online dating service must provide enough information about a user in order to pique the interest of a potential date. Yet the online dating service must be careful not to provide too much information and thus compromise the user's privacy, or maybe even put the user in danger. For this reason, many online dating services do not disclose contact information (such as email addresses) about users, but serve as intermediaries, forwarding messages between users (the intermediary role also makes it easier for online dating services to charge their users for sending messages to other users).

Because of privacy concerns, users of online dating services usually refer to other users by their profile names. A profile name is an alias that is associated with a user profile and identifies a user to other users. Some online dating services allow for users to have multiple profiles, and thus multiple profile names.

On the other hand, the semi-anonymous nature of online dating services, while necessary to preserve privacy, makes users' profiles untrustworthy. Anonymity usually prevents accountability and allows for dishonest behavior.

One of the most valuable features of online dating services is the ability to handle photographs of users. Users feel better and safer about communicating with other users if they know what the other users look like. In fact, the availability of photographs is often seen as a selling point for many online dating services. Most existing online dating services already provide the ability to add photographs and other multimedia information (such as sound, video clips, etc) to profiles. Some online dating services also allow users to send pictures and other multimedia information to other users without adding the pictures and other multimedia information to their profile.

In order for a user to make a picture available on his/her profile, or to send a picture to another user, the user must obtain a picture in digital format. The user must then send the picture over an Internet connection to a server belonging to the online dating service. These actions require the use of a computer which is connected to the Internet or another Internet enabled electronic device. The user must also have some knowledge of file management and/or Internet file transfer. These technical requirements prevent many users from sharing their photographs through online dating services. Also, the relatively cumbersome process of sending photos affects the nature of the photos. Photos are usually not spontaneous and are often rehearsed.

Multimedia Messaging Services (MMS) is an emerging field of cellular telephony. Multimedia Messaging Services allows users to send and receive multimedia messages from and/or to cellular phones. Multimedia messages may include video, audio, photographs, or other information. A cellular phone need not be Internet capable in order to be MMS capable. Thus, cellular phones that have MMS capabilities (MMS phones) are not necessarily Internet devices.

More recently, cellular telephones are being provided with digital cameras. Digital camera MMS phones allow a user to take digital photographs and transmit them through an MMS message.

However, current MMS technology requires that a user wishing to send a message know the cellular number of the receiving party. In addition, the sender usually must disclose his/her cellular phone number as well. This makes existing MMS services unsuitable for augmenting dating services, because one's cellular phone number is often considered too private to disclose as part of a dating service.

SUMMARY OF THE INVENTION

The present invention allows for users of dating services to send and receive photographs through their digital camera equipped MMS cellular phones. The transmission and reception of photographs is nearly instantaneous, and does not require knowledge of file management or Internet file transfer methods. Sending of photographs does not require transferring a photograph from a digital camera to a computer.

Since sending of photographs is easier and faster, the photographs being sent will be much more spontaneous and natural than the ones that are currently exchanged in the context of dating services. Also, the photographs may be taken and sent in real-time or nearly real-time, that is, the recipient will be able to view photographs that were taken only minutes (or even seconds) before. The real-time nature of the photograph exchange will make the photographs more spontaneous, less time consuming and more natural.

Users will be able to instantaneously show other users interesting aspects of their life through photographs. For example, a user may send another user a photograph of a location or event they are visiting. The spontaneous and unrehearsed nature of the photographs will inspire trust in users, and make meetings or dates between users more likely.

In response to the privacy concerns in dating services, the present invention ensures that the transmission and reception of photographs is relatively anonymous. The present invention is designed to prevent any unnecessary personal information from being disclosed. Thus, when utilizing the present invention, users initiate communications by using aliases. Of course, it is up to the users to control the disclosure of personal information contained in the actual photographs.

The present invention will allow dating services to add a valuable new feature in conjunction with cellular service providers. This new feature will help distinguish a dating service from among other services and may provide for an additional source of revenue.

In addition to photographs, the present invention also allows for other media, such as sound and movies to be exchanged.

According to the present invention, photographs may be sent from a camera equipped cellular phone to a computer, or another Internet enabled device, and from a computer or another Internet enabled device to an MMS equipped cell phone. The present invention also allows for messages that may include combinations of photographs, plain text, video and sound to be sent and received.

While dating services are one type of application where the present invention may be used, the present invention may also be used in any other context where real-time or near real-time anonymous exchange of pictures and other multimedia content over wireless networks is desirable.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DETAILED DESCRIPTION OF PREFERRED EMBODIMENTS

There are many different cellular phone networks operating in the world today. Many of these networks have developed or are developing MMS capabilities. The present invention may be implemented on any wireless network with MMS capabilities or equivalent capability and is preferably implemented on a wireless network which uses the CDMA standard to provide MMS services. Wireless networks serve as a medium for communication between wireless devices. Each wireless device on a wireless network is associated with an identifier, such as a phone number or an email address.

The embodiments described herein require cooperation between a cellular service provider and an application provider, such as a dating service. The cellular service provider and the dating service may be owned by the same or different entities.

The present invention is distinguished from existing MMS features, in that the present invention provides anonymous picture exchange with a degree of anonymity greater than existing MMS picture exchange systems.

Figure 1:
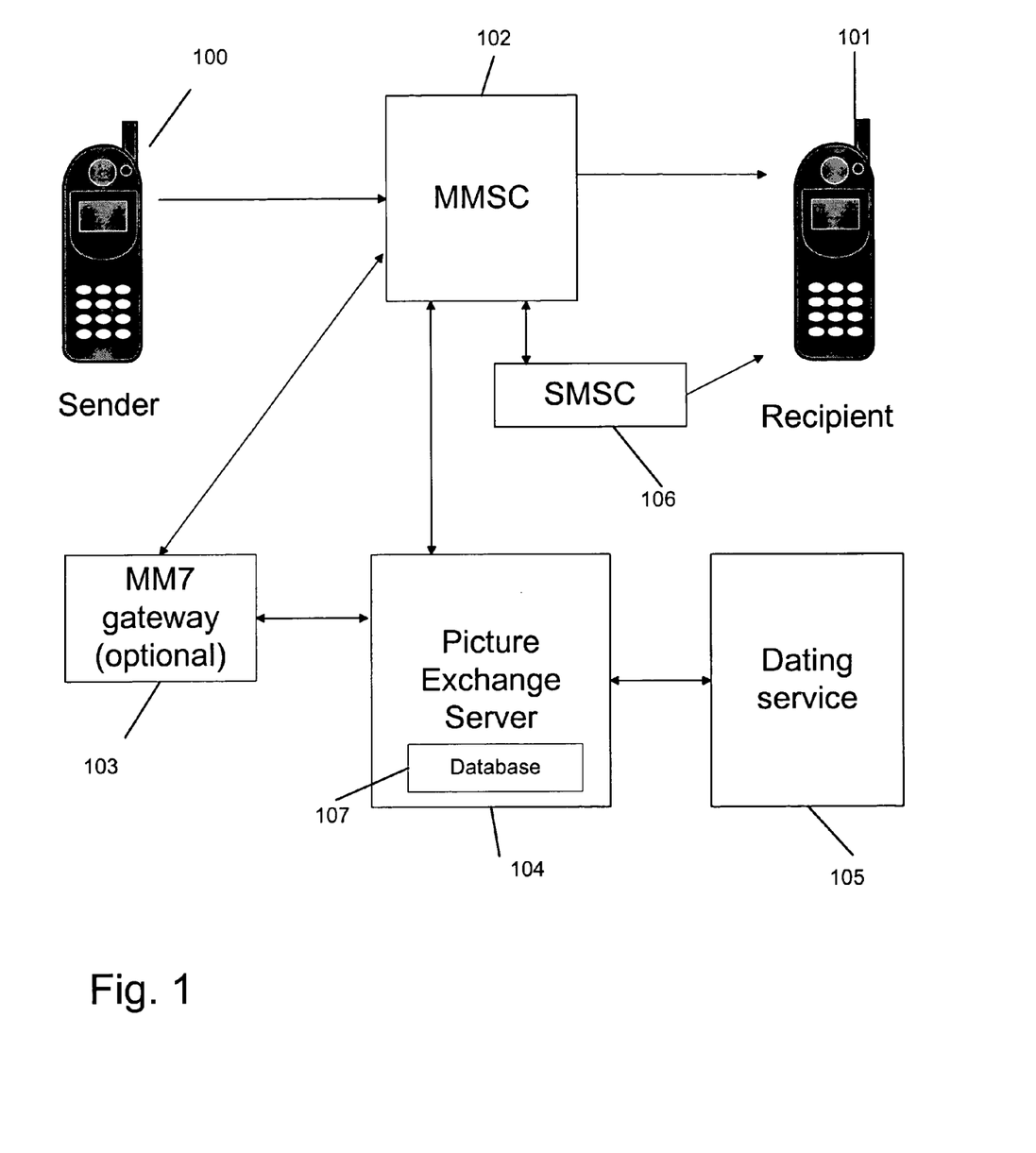
FIG. 1 is a block diagram of a preferred embodiment of the present invention.

FIG. 1 is a block diagram of a preferred embodiment of the present invention, in which a dating service 105 communicates with a picture exchange server 104. The picture exchange server includes a database 107, which contains various data associated with users. The dating service may be, but is not limited to, an online dating service, a phone-based or written publication-based dating service.

The dating service 105 offers its users the option of sending pictures to other users by way of a cell-phone. Each of the users of the dating service has an alias, by which he/she is identified. When a user chooses this feature, the dating service 105 communicates with the picture exchange server 104 in order to cause the cellular service provider to activate the feature for this particular user.

Figure 2:
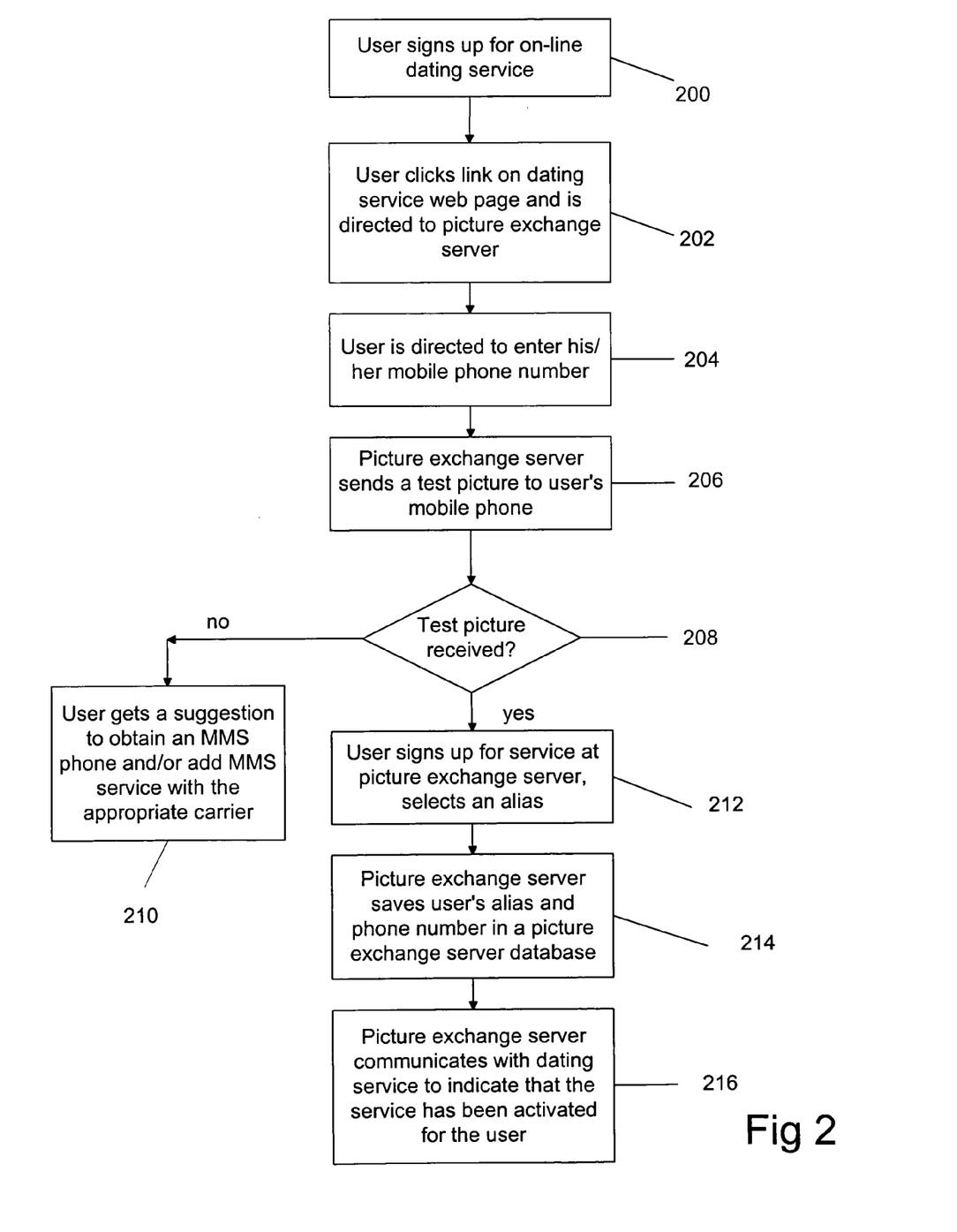
FIG. 2 is a flow chart of the process of activation of the picture exchange feature.

This process of activation of the anonymous picture exchange feature is illustrated in the flow chart of FIG. 2. In step 200, a user signs up for an on line dating service. At this point, the dating service may choose to ask the user to provide some additional information. In the preferred embodiment, this step is accomplished by having the user complete a form in a webpage.

In step 202, a user indicates interest in the picture exchange feature by clicking on a web site link and the dating service 105 redirects the user to the picture exchange server 104. More specifically, the user is redirected to a communication interface of the picture exchange server 104. In a preferred embodiment, this interface is also a webpage. In step 204, the picture exchange server obtains the user's mobile phone number. In step 206, the picture exchange server sends a test picture to the user's mobile phone. This will ensure that the user's phone has the necessary MMS capabilities. Optionally, the picture exchange server may also check whether the phone number provided by the user is served by the wireless service provider associated with the picture exchange server. In a preferred embodiment, the picture exchange feature is only available for users that have cellular accounts with a particular wireless service provider.

Alternatively, functionality across several wireless service providers (i.e., carriers) may be implemented by establishing communication links between the picture exchange server and the several wireless service providers. This implementation further requires that the picture exchange server have access to a Local Number Portability database for identifying the destination carrier when a message is being routed from one carrier to another. Alternatively, the destination carrier may be identified by user self-provisioning, i.e., requesting that each user identify their wireless service provider as a part of his/her profile. This information is only used by the application and is not shared with other users.

In step 208, the user indicates through the interface (i.e., a webpage) whether the picture was received or not. If it has not been received, the user is alerted that his phone does not have the requisite capabilities or that he is not using the MMS service of a wireless service provider that offers the picture exchange feature (step 210). If, however, the picture was received the user is directed to sign up with the picture exchange server 104 in step 212. The existence of two separate sign up steps 200 and 212 in FIG. 2 is due to the fact that in this embodiment, the dating service 105 and the wireless provider that controls the picture exchange server 104 are different entities. It is expected that each of these entities would prefer to enter into contractual relationships with the user, and/or receive certain information from the user regarding the anonymous picture exchange service. But if this is not the case, or if only one entity is involved, one of the sign up steps may be eliminated, for example, by having one entity pass the needed information to the other entity. When signing up for the picture exchange service in step 212, the user selects an alias.

In step 214, the picture exchange server saves the user's phone number and alias, and any other sign up information that is considered relevant in a picture exchange server database 107. In step 216, the picture exchange server 104 notifies the dating service 105 that the sign up has been successfully completed. After this notification, the dating service may indicate the user's ability to exchange pictures on his/her profile. Furthermore, depending on its billing arrangements the dating service may bill the user when the notification is received.

FIG. 1 shows the architecture of an MMS enabled wireless network. Some elements, such as radio towers, are not shown, because they are known in the art. The SMSC 106 is a short message service center, which is used to route short messages. It is used by the picture exchange server to send error messages to users. Such error messages may be sent, for example, when a user attempts to send a message to an invalid user name, long code or buddy list index. Furthermore, in some embodiments users may send commands to the picture exchange server 104 by way of text messages sent through the SMSC 106. These commands may be to edit buddy lists or block lists, or to change email options (see below). The SMSC is also used to forward notifications of pending MMS messages. An example of a currently utilized SMSC is the Message Register supplied by Motorola, Inc.

The MMSC 102 is a multimedia message service center, which is used to route pictures, movies and other multimedia. An example of a currently used MMSC is the Multimedia Messaging Center supplied by Telefonaktiebolaget LM Ericsson of Sweden. Usually, a wireless network includes many SMSCs and MMSCs networked together and serving various areas. For clarity, FIG. 1 shows a single MMSC and a single SMSC, but it should be noted that SMSC 106 and MMSC 102 may represent networks composed of a number of SMSCs and MMSCs, respectively.

The MM7 gateway 103 is an optional network element that can be used to facilitate routing between multiple MMSCs and the picture exchange server 104. The MM7 gateway 103 contains routing tables that direct messages to the correct MMSC based on destination phone number. The MM7 gateway 103 also routes messages to various software or hardware modules which provide value added functions for the wireless network, such as the picture exchange server 104. This latter routing function is performed based on short codes and/or long codes, which are described below.

In a preferred embodiment, the picture exchange server communicates with the MMSC 102 using the MM7 protocol in conjunction with the TCP/IP protocol. The SMSC 106 and the MMSC 102, communicate using SMPP protocol in conjunction with the TCP/IP protocol, which is often used for text messaging applications in wireless networks. This communication is necessary in certain wireless networks because MMS messages are not sent directly to a recipient without first establishing a 1X data session with the recipient. To achieve this, the MMSC 102 sends an SMS message to the SMSC 106. The SMSC then forwards the SMS message to alert the recipient that he/she has an MMS message waiting. The recipient may then choose whether to receive the message. If he/she chooses to receive the message, his/her phone establishes a 1X session with the MMSC 102 and initiates a download of the message.

Figure 3:
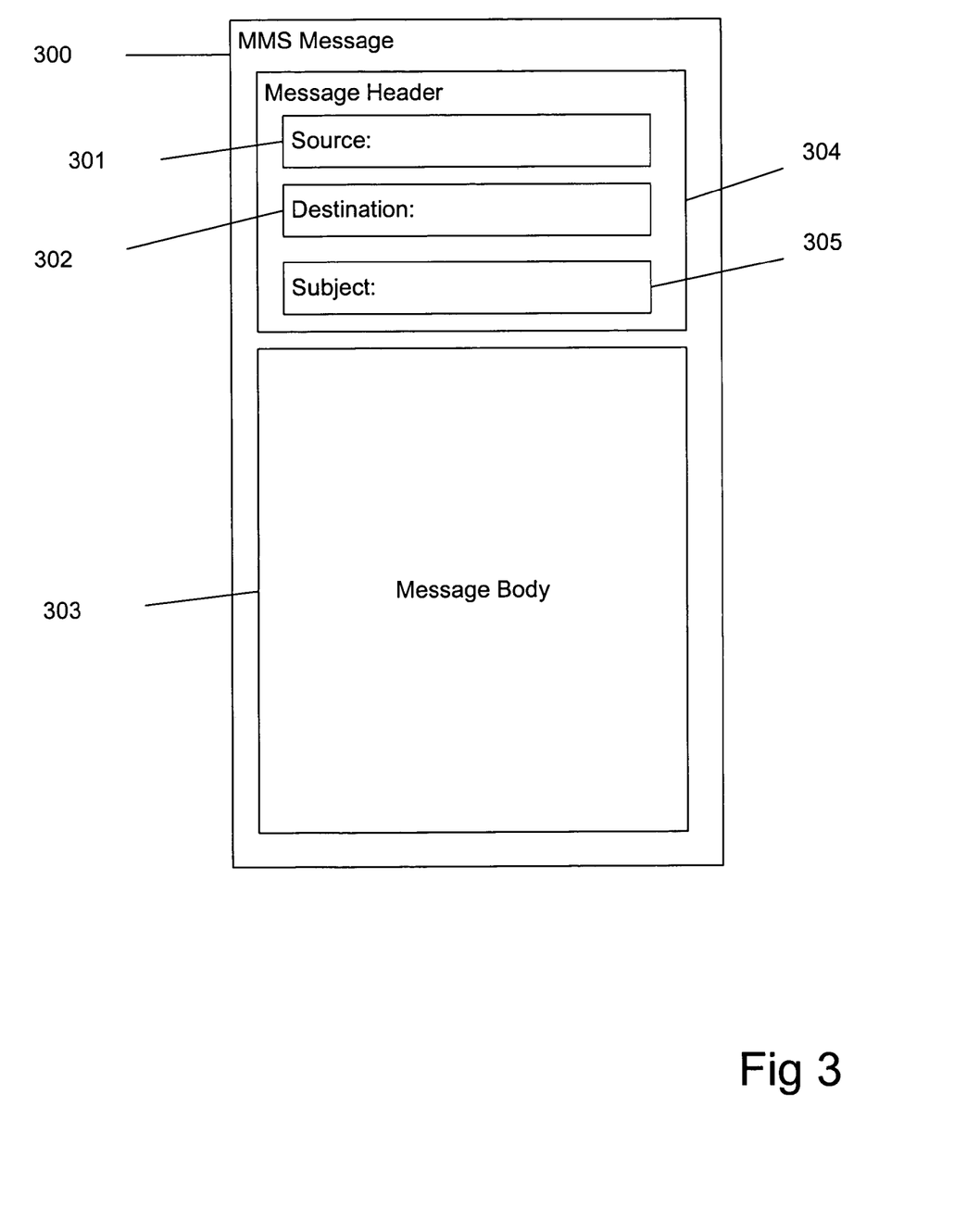
FIG. 3 is a diagram of an MMS message.

FIG. 3 is a diagram of an MMS message 300. The MMS message 300 includes a header 304 and a message body 303.

The body 303 may include content, such as pictures, video, other multimedia, text or any combination of this information. This content may be encoded in a variety of formats, including but not limited to MIDI, JPEG, PNG, GIF, and BMP formats. The body may also include code that is used to define the organization of the various media components in the body. This code may be implemented, for example, in the Synchronized Multimedia Integration Language (SMIL), which organizes messages in synchronized presentations.

The header 304 includes various pieces of information required for the relaying of the message, as well as text indicating the subject of the message. Some, but not all, of this information is included in the header fields 301 (source), 302 (destination) and 305 (subject) shown in FIG. 3. The subject field 305 is usually entered by the initiator of the message and indicates the subject of the message. The source and destination fields 301 and 302 indicate the source and destination of the message, respectively, and may be phone numbers, short codes or long codes.

Short codes are addresses that are assigned to applications and elements of the wireless network that are not phones and thus have no phone numbers. One such element is the picture exchange server 104. Long codes serve the same purpose as short codes but also include additional information. The relevance of the additional information is explained below. Short codes and long codes are both treated as regular phone numbers by the cellular phones, and their users. When a cellular phone sends a message, it automatically inserts its own phone number in the source field.

Referring back to FIG. 1, Sender 100 and Recipient 101 are two persons that own MMS phones, are users of the dating service 105, and have signed up for the anonymous picture exchange service by using the above described process. The Sender's phone is a camera phone, and Recipient's phone could also be a camera phone.

Figure 4:
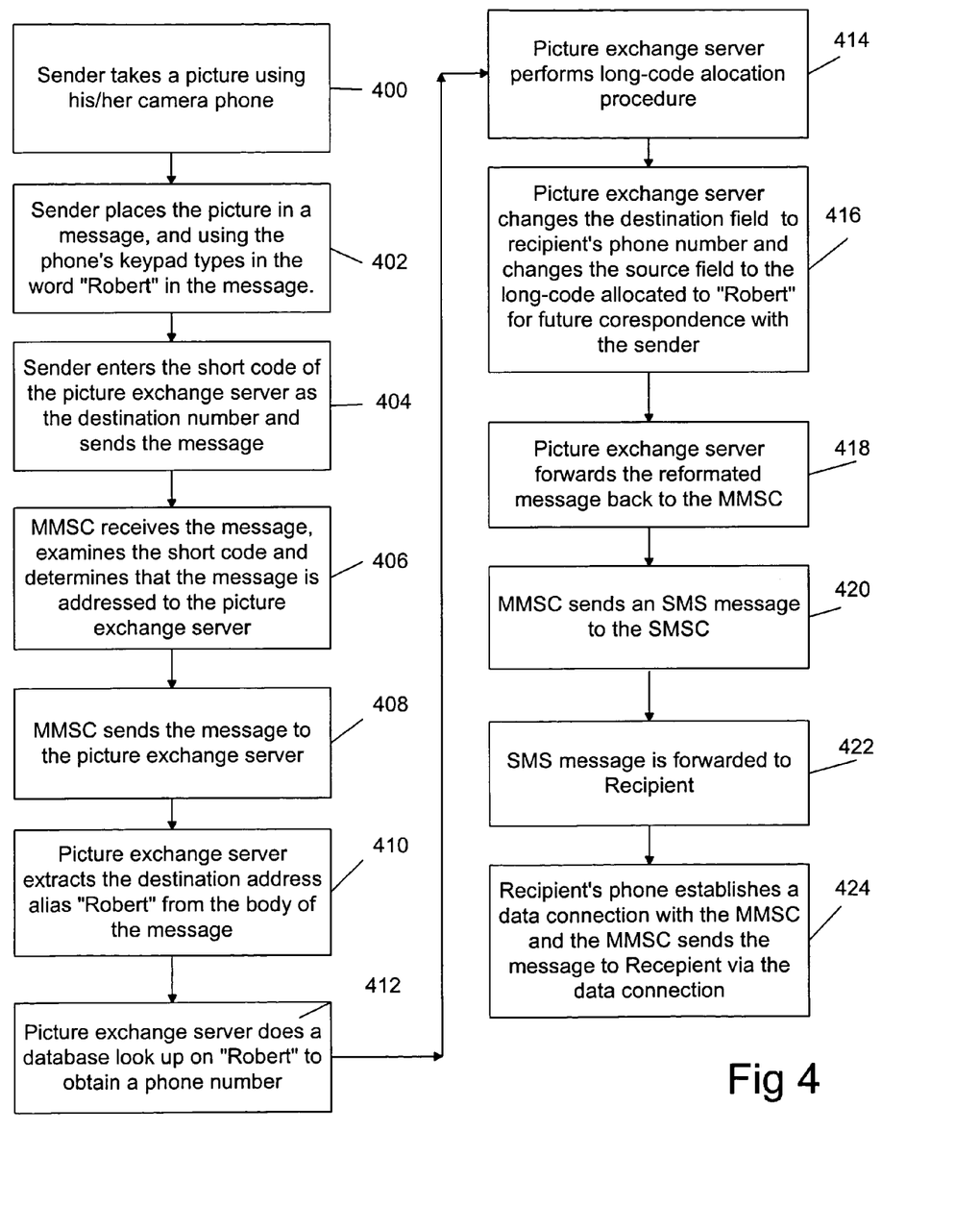
FIG. 4 is a flow chart showing the process of sending a message including a picture between two mobile phones using an alias.

FIG. 4 is a flowchart illustrating the process of sending a picture from the Sender to the Recipient, where the Sender has a profile in the dating service 105 under the alias 'Sandy' and the Recipient has a profile under the alias 'Robert'. After browsing various profiles in the dating service 105, Sender has taken a liking to the profile under the alias Robert and has decided to send a picture to that person.

In step 400, the Sender takes a picture using her camera phone. By utilizing functionality available in MMS camera phones, the Sender also places the picture in the body of a message. Then, in step 402, the Sender types in the alias 'Robert' and adds that text to the message. The Sender may add other text to the message, such as a personal greeting or note to the Recipient. It is necessary, however, that the alias of the recipient 'Robert' represent the first word of text in the body of the message 303 and that there be a space character following it. The term 'text' as used above refers only to text that would be normally displayed as such to a recipient of the MMS message and does not refer to any encodings of non text media, or any tags or other elements of a mark-up language.

The Sender then sends the message to the short code of the picture exchange server 104 (step 404). This short code is given to all persons that have signed up for the anonymous picture exchange feature. The actions of steps 400-404 need not be performed in the specific sequence illustrated.

The message, like all MMS messages, is initially directed to the MMSC 102. When the MMSC receives the message (Step 406), it examines the destination field 302 and detects the short code for the picture exchange server 104. The MMSC 102 sends the message (Step 408) to the picture exchange server 104.

In step 410, the picture exchange server 104 extracts the destination address alias 'Robert' from the body of the message. Then, in step 412, the picture exchange server performs a look-up in its database 107 based on the alias 'Robert'. Since the Recipient is signed up for the anonymous picture exchange service under the alias 'Robert', the picture exchange server will find a record corresponding to that alias that includes the Recipient's cell phone number. Alternatively, the recipient's alias may be placed in and retrieved from the Subject field 305, instead of the message body 303.

Once the picture exchange server 104 identifies the cell phone number associated with 'Robert', it may optionally remove the alias 'Robert' from the content of the message. This is done for aesthetic purposes, because the recipient does not necessarily need to see his alias in every message he receives.

The picture exchange server 104 may optionally perform a second database lookup, this time based on the Sender's phone number, which the picture exchange server retrieves from the source field 301 of the message. The second lookup allows for the Sender's alias—'Sandy' to be retrieved. The picture exchange server then places the alias 'Sandy' optionally preceded by the word "From:" in the content field 303 of the message. Thus, the Recipient will be able to see the alias of the person that sent him the message.

Once the picture exchange server 104 finds the record of the sender of a message, it updates the monitoring data on this record to indicate the message was sent, and optionally saves other attributes, such as size, date/time of sending, or recipient of the message. The monitoring data may be used for billing, marketing, security or other purposes.

Step 414 is optional. It is performed in a specific embodiment which uses long codes. Long codes ease repeated communications between two users. Step 414 and long codes in general are discussed in more detail below.

In step 416, the picture exchange server 104 changes the destination field of the message to the newly retrieved cell phone number associated with the alias 'Robert'. The source field 301 is changed to the long code allocated in step 414, if long codes are used, or to the picture exchange server's short code, if long codes are not used. The picture exchange server sends the modified message described above to the MMSC 102 (step 418). In step 420, the MMSC sends an SMS message to the Recipient's SMSC. The SMS message is forwarded to the recipient (Step 422). Upon receipt of the SMS message, the Recipient's phone establishes a 1X data session with the MMSC. Once a 1X session is established with the Recipient's phone, the MMSC sends the message to the Recipient via the 1X data connection (Step 424). The Recipient receives the message and is able to view the Sender's picture.

Modern cellular telephones are programmed to store phone numbers (or similar addresses such as short codes) and to assist the user in initiating calls, or sending SMS/MMS messages to these numbers. Thus, users are not required to remember phone numbers, or input them into a cell-phone every time they need to make a call or send a message. Although cellular phones are not programmed to automatically initiate calls to aliases, a user may configure his/her phone to store the short code for the picture exchange server 104. But, according to the present invention, in order to use the anonymous picture exchange feature, the alias of the recipient must also be included in the message. Thus, the ability to save the short code does not relieve a user from the necessity of having to enter the alias of a recipient.

Most cellular phones are programmed to allow users to easily initiate a response message to a received message. This is usually performed by simply switching the source and destination field values of the received message into the response message. However, the "respond to message" feature of most currently used cell-phones cannot be used in conjunction with the above described embodiment which uses alias addressing, because the sender's phone number is removed from the source field 301 by the picture exchange server 104 before the message is delivered to Recipient. Also, even if an incoming message includes the Sender's alias, existing phones are not configured to automatically place this alias in the reply message. For example, if the text "From: Sandy" appears in the body of the message received by Recipient, an attempted reply will not automatically include "Sandy" as the first text item in the body of the reply message absent modifications of the telephone, or its software. However, it is preferred that the present invention be usable without requiring modifications of users' telephones.

This issue is addressed with the aid of long codes and the picture exchange server 104. As pointed out above, long codes designate elements of a wireless network and carry additional information. The MMSC 102 is able to resolve a long code's association with the picture exchange server 104. Accordingly, the MMSC 102 treats long codes the same way it treats short codes—it uses them to resolve the destination of a message. A plurality of long codes are assigned to the picture exchange server 104. Messages that are addressed to these long codes are sent to the picture exchange server 104, by the MMSC 102.

The picture exchange server designates a long code for various messages it routes (if long codes are utilized). The long code designated for a message is placed in a long code record, which is uniquely associated with the recipient of the message. Thus, the same long code may be used many times, when associated with different recipients. Each long code record associated with a certain recipient includes information sufficient to identify the sender of a message to that recipient. Thus, each long code record typically includes the phone number of a sender. To make economical use of the available long codes, and to prevent overloading of the database 107, the picture exchange server 104 sets expiration timers on the allocated long codes. When an expiration timer expires, an allocated long code is deallocated, that is its record is deleted and it is made available for future allocations. When an allocated long code is used for message routing its expiration timer is reset. Since several instances of the same long code may exist in different long code records for different recipients, when a single instance associated with a particular recipient is deallocated, the deallocation is only valid in relation to that particular recipient (i.e., only that particular long code record is deleted), other instances associated with other recipients are still valid. The above described procedures allow for a relatively small number of long codes (such as, for example, 1000) to be assigned to the picture exchange server without fear of conflicts.

According to the embodiment of the present invention which utilizes long codes, when the picture exchange server receives a message that does not contain a long code, it initiates the long code allocation process (step 414). First, the picture exchange server checks the long codes already allocated to Recipient, to determine whether there already exists a long code record allocated to recipient which identifies Sender. If this is the case, the already allocated long code is used for the subsequent steps. If this is not the case, the picture exchange server 104 generates a long code that is associated with the Recipient, and creates a long code record which includes the long code as well as Sender's phone number. The long code record further includes a time stamp. Additional fields, such as the alias of the Sender and the expected expiration time of the long code are optionally added.

It should be noted, that in this particular embodiment, long codes are independently generated for each sending party. Thus, if two parties exchange messages between one another, the long code allocation process will be performed twice, and there will be a different long code record associated with each party. In the context of the present example, if Recipient sends a message back to Sender another long code will be generated. The new long code will be associated with Recipient, and the long code record will include Sender's phone number. The long code given to the Recipient to communicate with the Sender is usually different than the long code given to the Sender to communicate with the Recipient. Trying to assign the same long code to both parties results in relatively inefficient use of the available long codes, since a long code available for one party may be unavailable for the other.

Subsequently, in step 416 of FIG. 4, the picture exchange server 104 does not change the source field of the message 301 to the picture exchange server's short code, as previously described, but to the previously created long code. Once the long code is created it can be used by the Recipient to send messages to the Sender in lieu of the alias. When the picture exchange server receives a message that is addressed to a long code, the sender's phone number is used in combination with the long code to determine the appropriate destination. This functionality is explained in more detail below. The long code has an advantage because it is treated in a manner similar to a cell phone number by cell-phones as well as the wireless network. In particular, long codes can be included in the source 301 and destination 302 fields of the message. Long codes are included in the source field when the message is delivered by the picture exchange server to the MMSC 102. Long codes are included in the destination field when a user sends a message addressed to a long code. Long codes can also be saved by cell-phones as phone numbers. Thus, the cell phone's "reply" function, as well as various cell phone memory and quick dial functions can be used in conjunction with long codes.

Figure 5:
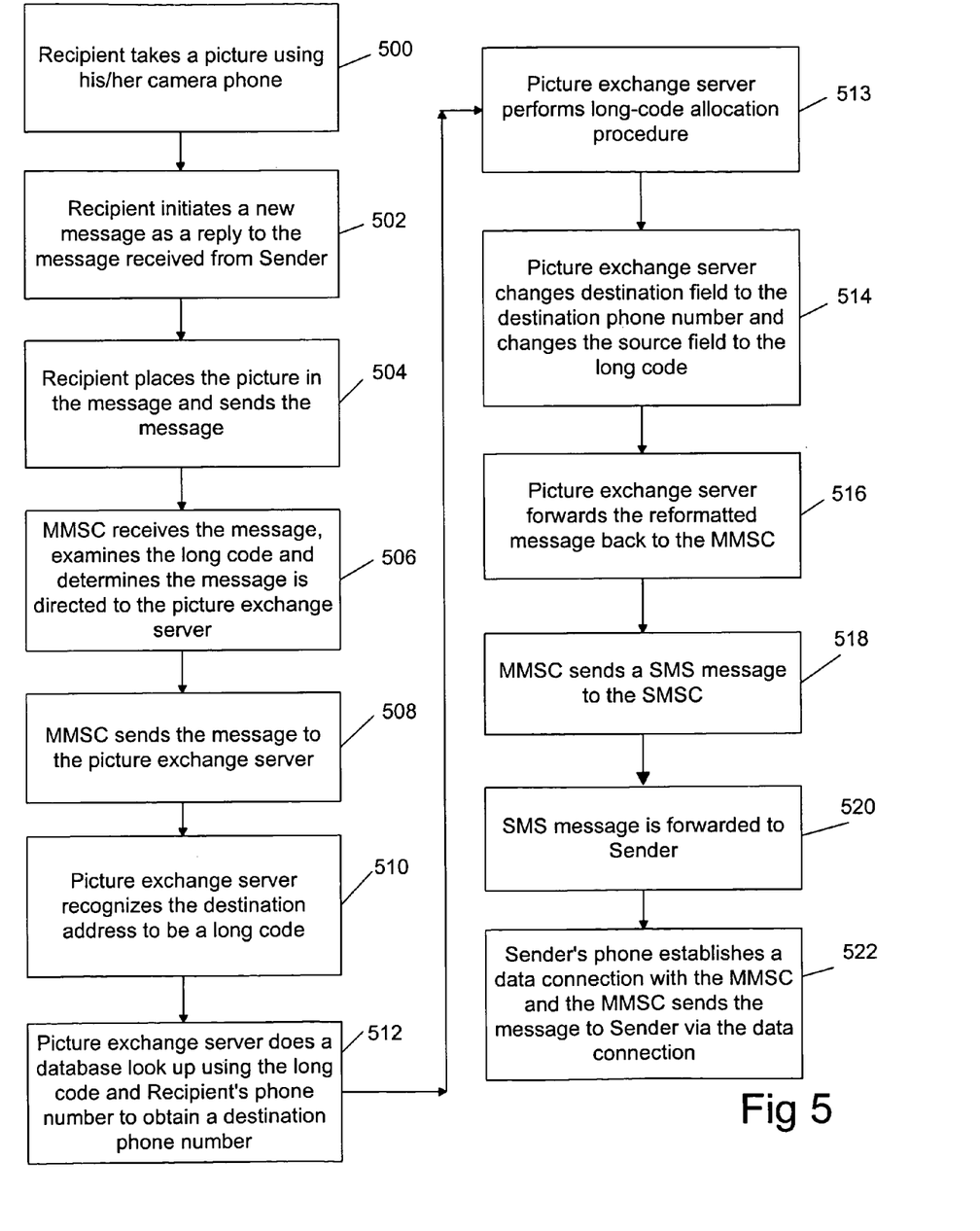
FIG. 5 is a flow chart showing the process of sending a message between two mobile phones, using a long code.

Having received a message from Sender, Recipient may wish to reply to the message, using the long code. FIG. 5 is a flowchart showing the process of sending a message using an already allocated long code. The process of FIG. 5 is performed after the process of sending the initial message (as described in FIG. 4) including the long code option. Of course, the Recipient is not required to use this process and may instead use the alias based process as described in FIG. 4.

In step 500, the Recipient takes a photograph, which he wishes to include with the return message. This step is optional. The Recipient may instead (or in addition) type in some text that is to be sent as a reply. In step 502, the Recipient initiates a message as a reply to the message received by the Sender. This is performed by using a standard "reply to message" phone function. In addition, the Recipient may have saved the long code of the message received from the Sender. This will allow Recipient to optionally initiate the message by using the phone number storing feature of his phone.

In step 504, the Recipient places the picture in the message (and/or types in reply text) and sends the message. In step 506, the MMSC receives the message, determines that the long code is associated with the picture exchange server, and forwards the message to the picture exchange server 104 (step 508). The picture exchange server 104 recognizes the destination address to be a long code (step 510). This indicates that the destination of the message may be obtained from the long code and extracting destination information from the body of the message is not necessary.

In step 512, the picture exchange server 104 has to retrieve the Sender's phone number. For this purpose, the picture exchange server retrieves the long code from the destination field of the message 302 and Recipient's phone number from the source field 301, and looks for a long code record in its database 107 which is associated with Recipient (based on Recipient's retrieved phone number) and includes the retrieved long code. If a database entry cannot be found, the picture exchange server 104 returns a message addressed to the Recipient's phone number (which can be retrieved from the source field 301 of the current message) informing the Recipient that the long code is invalid or expired. If this occurs, the Recipient can re-send the message using the alias addressing method described in FIG. 4.

In step 513, the picture exchange server again performs the long code allocation procedure. In this case the Recipient is sending the message and Sender is receiving it (as opposed to step 414). Thus, a long code record is associated with the Sender, and Recipient's phone number is included in the long code record. Absent a coincidence, the actual long code allocated in step 513 is different than the long code allocated in step 414.

Subsequently, in step 514, the picture exchange server places the Sender's phone number in the destination field of the message 302. The picture exchange server also places the long code allocated in step 513 in the source field of the message 301. This accomplishes two purposes: it deletes the Recipient's phone number from the source field, thus ensuring anonymity and it allows the Sender to make future use of the long code. In steps 516, 518, 520 and 522 the message is sent to the Sender. These steps are analogous to steps 418, 420, 422 and 424 of FIG. 4.

In order to further facilitate the ease of messaging, an embodiment of the present invention further includes "buddy list" functionality. Buddy lists are lists of persons who can be messaged easily. Buddy lists are stored in the picture exchange server database 107, and are preferably stored as part of a user record which includes the user's profile alias, his/her phone number and other relevant information about the user.

A user may add or remove entries from his or her buddy list. This is performed in different ways in various embodiments. In one embodiment the picture exchange server 104 includes an Internet (preferably World Wide Web) interface. The user may edit his/her buddy list using this interface. In another embodiment, the buddy list functionality of the picture exchange server 104 is integrated with the dating service 105. Thus, the user edits his/her buddy list through the dating service 105 (which will also preferably include a World Wide Web interface) and the changes are communicated to the picture exchange server 104. In yet another embodiment, the user edits his/her buddy list by sending commands from his cell phone. The commands are embedded into text messages and are addressed to the picture exchange server's short code. When the picture exchange server receives a command it modifies the buddy list accordingly.

Figure 6:
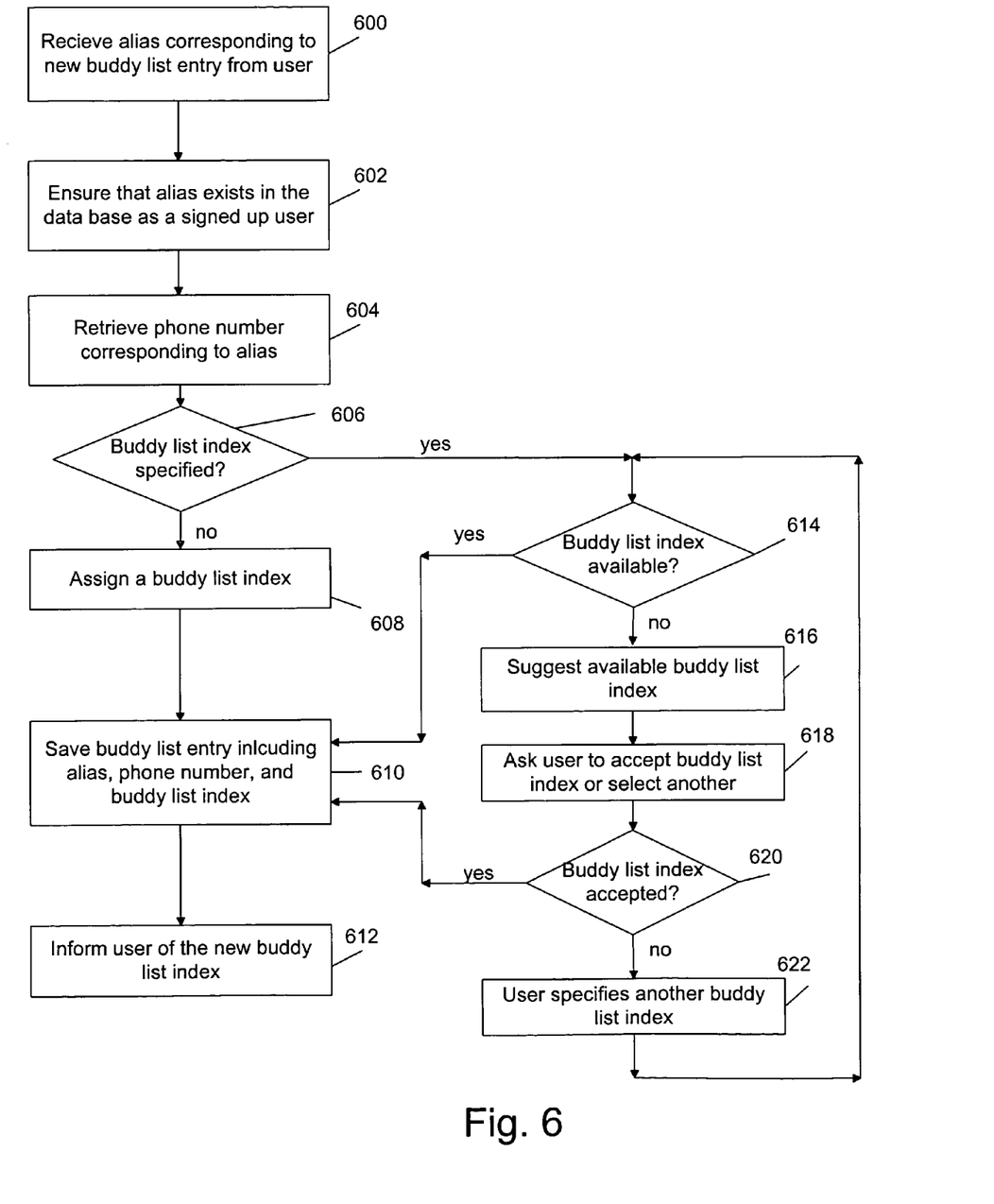
FIG. 6 is a flow chart showing the process of adding an entry to a user's buddy list.

FIG. 6 shows the process of adding a new entry to a user's buddy list. In step 600, the user sends a request to add an entry, the request including the alias of the person the user wishes to add. In step 602, the picture exchange server 104 checks to see if there is an existing corresponding user entry in its database 107. Thus, the picture exchange server 104 ensures that the users added as buddies are actually signed up for the service.

The picture exchange server 104 then retrieves the phone number corresponding to the alias being added (step 604).

Buddy list assignments involve the use of buddy list indexes. The buddy list index must be easy to dial, and there must be enough possible buddy list index combinations to provide unique identifications for a reasonable number of buddy list entries for a single user (usually about 10). Furthermore, the buddy list index must be in a form different than that of a user alias. All of the above conditions are preferably satisfied by using a short (one or two digit) number for the buddy list index. If such indexes are used, users should not be allowed to designate aliases that start with a digit. This is a fairly simple rule, however, and is unlikely to inconvenience users. In the preferred embodiment, buddy list indexes do not expire.

In step 600, a user sends a request to the picture exchange server for a buddy list entry. The request includes an alias which the user wishes to add to his/her buddy list. The request is made using one or more of the above described methods. The request optionally includes a preferred buddy list index. The user may thus request that a particular buddy list index be assigned to an alias. Alternatively the user may let the picture exchange server assign the next available buddy list index. In step 602, the picture exchange server 104 ensures that the alias included in the request corresponds to a signed up user. If this is the case, the picture exchange server 104 retrieves the phone number corresponding to the requested alias from the database 107. The picture exchange server determines whether the user has specified a preferred buddy list index to be assigned to the requested alias (step 606). If a preferred buddy list index number has not been specified, then the picture exchange server 104 assigns a buddy list index (step 608).

In step 610, the picture exchange server 104 creates and saves in the database 107 an entry, including the requested alias and the phone number corresponding to it and the buddy list index. The entry is preferably saved in the record associated with the user who owns the buddy list (i.e., the requestor). There may be additional information saved with each entry. For example, each entry could also hold statistical data as to how many messages were sent to the person corresponding to that entry.

In step 612, the user is alerted of the buddy list index entry he/she just created. The user must be in possession of his/her buddy list indexes in order to use the buddy list to send messages. The user may request a list of his/her buddy list indexes if he/she has forgotten them.

If a user has specified a preferred buddy list index to be associated with an alias, then the picture exchange server verifies that the buddy list index is available for that user (step 614). If it is available, the assignment is made and the user is notified in steps 610 and 612.

If a preferred buddy list index is not available, the user must be informed and a different buddy list index is required (step 610). A new buddy list index is suggested. The user is asked whether he/she would like to use the suggested buddy list index (step 618). If the user accepts the buddy list index (step 620) then the assignment is made and the subscriber is notified in steps 610 and 612.

If the subscriber chooses to reject the suggested buddy list index in step 620, the user is prompted to specify another buddy list index (step 622). The picture exchange server confirms whether the buddy list index is available for this user (step 614). This process will eventually lead to the assignment of a buddy list index and the user will be notified in steps 610 and 612.

If the user wishes to send a message using a buddy list index he/she uses a method similar to that shown in FIG. 4. However, in step 402, instead of typing in an alias, such as 'Robert', the user types in a buddy list index, such as the digit '5'. This will save the user some effort, since digits are much easier to type on most currently used phones than letters. When the picture exchange server 104 processes the message in step 412, it does not do a database lookup on 'Robert', but instead it does a much simpler search in the user's buddy list record for an entry corresponding to the buddy list index '5'. This record will include the phone number of the receiving party. The rest of the process is analogous to that of FIG. 4.

Conventional blocking features of existing phone networks cannot be used in the context of the present invention, because these features are based on phone numbers, and the present invention often hides phone numbers for the purpose of anonymity. Therefore, in order to avoid the hassle of unwanted messages, some embodiments of the present invention include blocking functionality. Blocking is implemented by block lists. Each user record includes a block list, which may be managed by users in methods similar to the above described methods of managing buddy lists. Thus, a user's block list can be managed, for example, from a World Wide Web interface or from the user's phone. When managing a block list from a user's phone, a user (blocker) signals who they would like to block (blockee) by sending a message to the picture exchange server, the message including the blockee's alias and a predefined instruction. Having received the message, the picture exchange server adds the blockee's alias to the user's block list. Optionally, the blockee's phone number is added to the user's block list database record (after being retrieved from the blockee's user record) for efficiency purposes. When the picture exchange server routes a message to a user, it checks whether the sender is on the recipient's block list and if this is the case it does not send the message.

The process of blocking multiple aliases creates a block list for the user. Block lists are saved in the blocker's user record and list all blocked aliases for that user. Thus, a user's block list holds all his/her blockees. When sending a message, the picture exchange server checks whether the sender's alias or phone number is in the recipient's block list. If this is the case, the message is not sent. Instead, an optional notification may be sent to the Sender. When a subscriber chooses to discontinue picture exchange service, their block list, along with all other personal data is removed from the active system.

Figure 7:
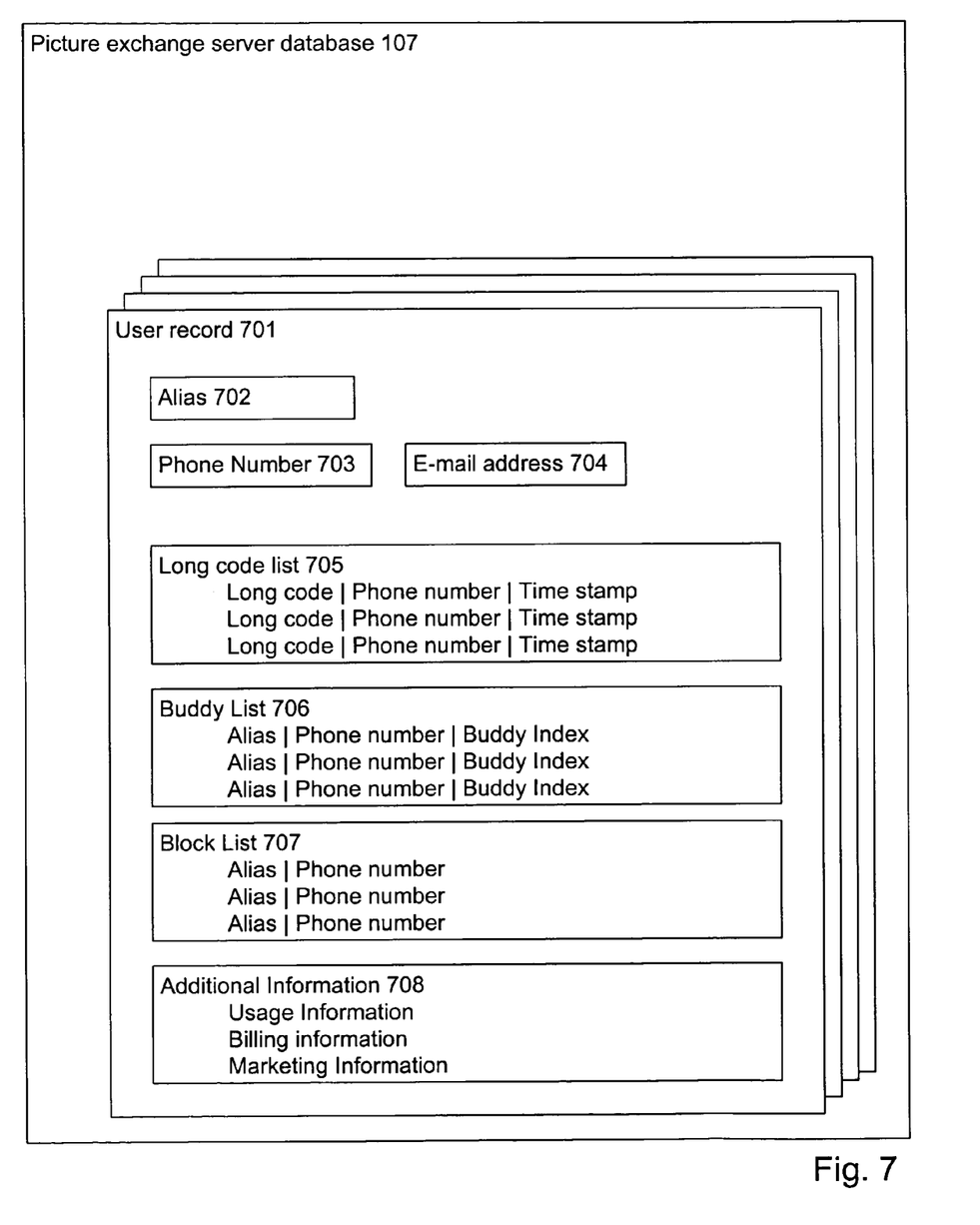
FIG. 7 is a block diagram of the database of the picture exchange server.

FIG. 7 shows an exemplary organization of the picture exchange server database 107. The database includes a plurality of user records 701. Each user record includes the alias of the corresponding user 702, the phone number of the user 703, and optionally the e-mail address of the user 704. The user record 701 includes a long code list 705. The long code list includes one or more long code records which are associated with the user. Each long code record includes a long code, a phone number of another user who is represented by this long code and a time stamp. The user record further includes a buddy list for the user 706. The buddy list includes one or more buddy records each including the alias, phone number, and buddy index of a corresponding user.

The user record 701 also includes a block list 707, which includes one or more block list entries, each including an alias and a phone number associated with a blocked user. Furthermore, additional information 708 may be kept in the user record. This information may include usage information, billing information, and/or marketing information.

Figure 8:
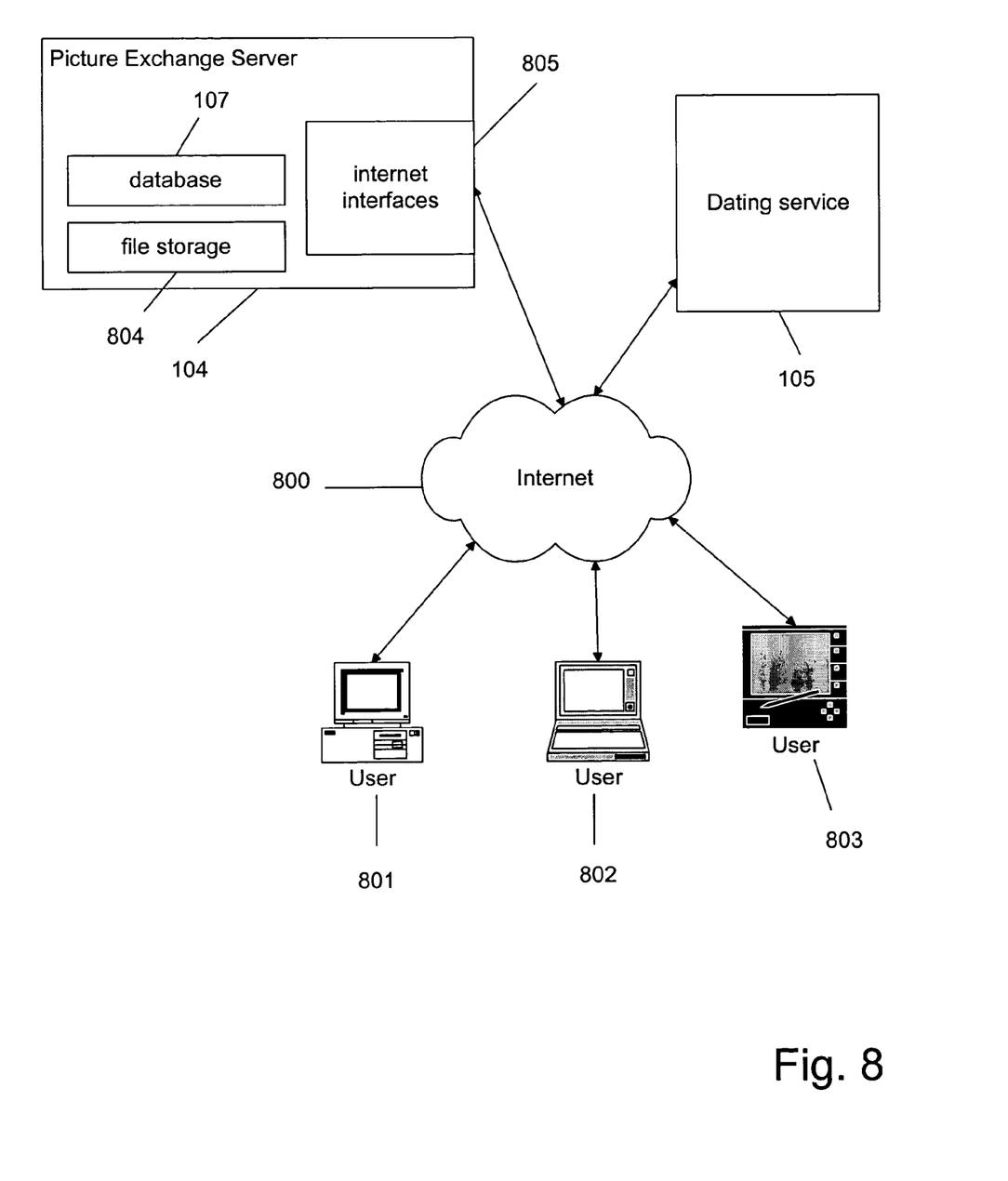
FIG. 8 is a diagram of the picture exchange server.

FIG. 8 is a diagram showing some additional features of the picture exchange server 104. In a preferred embodiment, the picture exchange server is connected to the Internet or another widely used computer network 800. The wireless network elements of FIG. 1, such as MMSC, SMSC, etc., are not shown in FIG. 8 for the sake of clarity, but they are present. Preferably, the connection between the picture exchange server 104 and the dating service 105 is through the Internet 800 as shown, so that the picture exchange server 104 and the dating service 105 can exchange sign up, billing, and monitoring information.

The above description focuses on users interacting with the picture exchange server by cell phone. However, in a different embodiment users are also able to interact with the picture exchange server 104 through computing devices 801-803, which are connected to the Internet. This allows users to take advantage of the usually higher bandwidth and storage capacity featured by these devices.

The file storage 804 is an optional feature of the picture exchange server 104. Because cellular phones tend to have relatively small memories, a user may not be able to store all the messages he/she sends and receives on his/her cellular phone. Yet the user may wish to access these messages at a later time. For this purpose, the user may have his/her sent and/or received messages stored at the picture exchange server 104. The user may configure the picture exchange server to store the messages he/she sends or receives in the file storage 804. The user may later retrieve these messages by using a computing device connected to the Internet, such as devices 801-803. Every stored message is associated with a particular user, and may only be accessed by that user. Furthermore, the user may request that these messages be emailed to him or her.

The picture exchange server 104 includes various Internet interfaces 805 for the purposes of communication through the Internet. The Internet interfaces 805, preferably include a web interface (HTTP) for communicating with users over the Internet. Thus, the web interface may serve web pages to computing devices 801-803 and enable communication with the corresponding users. Through these webpages users may change the settings of their profile including buddy lists and block lists, and retrieve or delete messages that have been stored in the file storage 804 for them. The Internet interfaces further include an email interface for emailing messages to users, that have requested this feature. The picture exchange may further include additional interfaces, such as an MM7 interface for communication with the MMSC, an SMPP interface for text messaging, an FTP interface for transfer of files such as billing files and the like, an SQL or other database synchronization interface for sharing user data between applications and other interfaces for optimization and feature development.

Users may wish not to have all of their messages automatically saved or emailed, but to be able to choose which messages are to be saved or emailed. This is accomplished by another optional feature of the picture exchange server 104. If a user wishes to have a particular message saved or emailed to him/her the user sends the message to the picture exchange server 104 in the manner described in FIG. 4. However, instead of inserting an alias of a recipient user in the message, the user inserts a key word that represents a command to save or email the message. For example, the keyword 'email' may be used as a command to email the message and the key word 'save' may be used as a command to save the message in the file storage 804 of the picture exchange server 104. These commands, if used, are reserved, and no aliases are allowed to duplicate them.

The present invention may also include the additional feature of allowing a user to send and receive pictures from an Internet enabled device. In such a case, the user need not possess an MMS enabled cell phone (or any cell phone at all for that matter) in order to take advantage of the anonymous picture exchange service. The user signs up as usual, but indicates that he/she wishes to be an Internet user, i.e., to send and receive pictures over the Internet only. He/she is not asked to provide a phone number, but instead to provide an email address. The picture exchange server saves a user record based on that sign-up information. The user may then send emails to the picture exchange server that are to be forwarded as MMS messages to another user (the recipient). The user must include the recipient's alias as the first text word in the email message. The user may attach pictures or other media to the email message, but must make sure that all attached media complies with the requirements of the MMS network, and devices. That is, pictures must be of a compatible file type.

Internet based users can address their messages to the application's email address in a format such as 'friend@pictureservice.com' and provide an alias as the first word in the body of the email message. When the picture exchange server receives an email from an Internet based user, it extracts the alias of the recipient from the body of the email, and retrieves a phone number based on that alias in a way similar to that described in step 412 in FIG. 4. Alternatively, email messages can be addressed to <alias>@<pictureservice>.com where <alias> is a user's alias, and <pictureservice> is a domain name associated with the picture service. Having received such an email, the application may then use the <alias> portion of the destination email address to retrieve a destination phone number. The body of the email is then converted to a format suitable for placement in an MMS message and is sent to the recipient in a manner analogous to that described in steps 414-424. Long code allocation may still be performed, and can be sent to the Internet based user. In this context, long code allocation is performed by saving source and destination email addresses rather than sender and recipient mobile numbers in the long code records. For example, if an Internet based user receives a message from a mobile user, the email will appear with a source email address in the format 'longcode@pictureservice.com'. This will allow the Internet based user to easily reply to the message without knowing the true address of the recipient. As with the use of long codes for mobile devices, the Internet based user's email address is used to map the long code to a unique user. This allows the same long code to be assigned to other users without conflict.

An MMS phone user sends messages to an Internet based user in the same manner he/she would send messages to any other user. Thus, this can be performed using an alias, a long code, or a buddy list index. When the picture exchange server 104 receives a message destined for an Internet based user it retrieves the associated user profile, where it is indicated that the recipient is an Internet based user. The picture exchange server then reformats the message for placement in an email and sends it in an email to the recipient.

Persons skilled in the art will understand that the above described features may be modified for use with other Internet based methods of communication such as instant messaging.

The above disclosure has, for the sake of clarity, centered on sending and receiving pictures. Yet, a person skilled in the art would recognize that the above described embodiments may be used for sending and receiving any media or combination of media supported by the wireless MMS network that is used. Examples of such media include text, pictures, movies, sound, and slide shows encoded in various formats. Furthermore, various pieces of media may be organized in the message by markup code defined by a markup language, such as SMIL. Furthermore, while the above disclosure is presented in the context of an MMS network, a person skilled in the art will recognize that the present invention may be adapted for other networks configured to wirelessly exchange messages.

While the present invention is described in relation to the CDMA network, a person skilled in the art will recognize that the present invention may be easily used with other wireless networks, such as, for example, the GSM network. Thus, when the foregoing description refers to components that are specific to the CDMA network, such as the SMSC and the MMSC, it should be understood that these components are provided as examples only and analogous components associated with other networks may be used instead.

While the foregoing description and drawings represent illustrative embodiments of the present invention, it will be understood that various changes and modifications may be made without departing from the spirit and scope of the present invention.

What is claimed is:

1. A method for exchanging messages through a wireless network between a sender using a first wireless device and a recipient using a second wireless device, the second wireless device having a recipient phone number associated with it, the method comprising the steps of:
    associating a recipient alias with the recipient;
    initiating a first wireless network messaging service message using the first wireless device;
    inserting content into the first message of the first wireless device, the content including at least some non-text content;
    inserting the recipient alias in the body of the first message of the first wireless device;
    inserting a short code associated with an exchange server in a destination address field of a header of the first message;
    sending the first message to the wireless network using the first wireless device, using the short code as the destination, wherein the recipient phone number is not included in the first message;
    retrieving the recipient alias from the first message;
    retrieving the recipient phone number by performing a database lookup based on the recipient alias;
    allocating one of a plurality of long codes of the exchange server to the recipient;
    saving the allocated long code, an identifier associated with the sender and the recipient phone number in a long code record;
    forwarding the first message from the exchange server to the recipient through the wireless network based on the recipient phone number as a destination and using the allocated long code as a source address;
    creating a second wireless network messaging service message at the second wireless device, the second message being a reply to the first message;
    providing the allocated long code as the destination of the second message;
    sending the second wireless network messaging service message from the second wireless device; and
    responsive to the allocated long code as the destination of the second message, using the long code record to forward the second message through the wireless network to the first wireless device.

2. The method of claim 1, wherein the alias is a buddy list index.

3. The method of claim 1, wherein the first message is a multimedia messaging service (MMS) message.

4. The method of claim 3 wherein the second message is a multimedia messaging service (MMS) message.

5. The method of claim 1, wherein:
    the exchange server is a picture exchange server, and the short code and the allocated long code are associated with the picture exchange server, for routing the message via the wireless network to the picture exchange server.

6. The method of claim 5, wherein the steps of retrieving the recipient address, retrieving the recipient phone number and forwarding the first message are performed by the picture exchange server.

7. The method of claim 5, further comprising the steps of:
    changing the destination in the first message to the recipient telephone number; and
    removing the recipient alias from the first message.

8. The method of claim 1, wherein the step of forwarding the second message comprises:
    changing the destination of the second message from the long code to a phone number associated with the first wireless device, at the exchange server; and
    sending the second message with the phone number of the first wireless device through the wireless network.

9. A method of providing an exchange of messages through a wireless network between a sender using a first wireless device and a recipient using a second wireless device, a recipient phone number associated with the second wireless device, the method comprising the steps of:
    associating a recipient alias with the recipient;
    receiving a first wireless network messaging service message from the first wireless device, routed via the wireless network to an exchange server using a short code as a destination address, wherein:
        (a) the first message contains content including at least some non-text content,
        (b) the recipient alias is included in a body of the first message;
        (c) the short code associated with the exchange server is included in a destination address field of a header of the first message, and
        (d) the recipient phone number is not included in the first message;
    retrieving the recipient alias from the first message;
    retrieving the recipient phone number by performing a database lookup based on the recipient alias;
    allocating one of a plurality of long codes of the exchange server to the recipient;
    saving the allocated long code, an identifier associated with the sender and the recipient phone number in a long code record;
    forwarding the first message from the exchange server, for delivery to the recipient through the wireless network, based on the recipient phone number as a destination address and using the allocated long code as a source address;
    receiving a second wireless network messaging service message from the second wireless device, routed via the wireless network to the exchange server using the allocated long code as the destination address of the second message, the second message being a reply to the first message; and
    responsive to the allocated long code as the destination address of the second message and using the long code record, forwarding the second message through the wireless network for delivery to the first wireless device.

10. The method of claim 9, wherein the alias is a buddy list index.

11. The method of claim 9, wherein the first message is a multimedia messaging service (MMS) message.

12. The method of claim 11, wherein the second message is a multimedia messaging service (MMS) message.

13. The method of claim 9, wherein:
the exchange server is a picture exchange server, and
the short code and the allocated long code are associated with the picture exchange server, for routing messages via the wireless network to the picture exchange server.

14. The method of claim 13, wherein the steps of retrieving the recipient address, retrieving the recipient phone number and forwarding the first message are performed by the picture exchange server.

15. The method of claim 13, further comprising the steps of: changing the destination in the first message to the recipient telephone number; and removing the recipient alias from the first message.

16. The method of claim 9, wherein the step of forwarding the second message comprises:
changing the destination address of the second message from the long code to a phone number associated with the first wireless device, at the exchange server; and
sending the second message with the phone number of the first wireless device through the wireless network.

17. A system for providing an exchange of messages through a wireless network between a sender using a first wireless device and a recipient using a second wireless device, a recipient phone number associated with the second wireless device, the system comprising:
an exchange server having a connection for communication of messages through the wireless network; and
a database, accessible by the server, having a record associating a recipient alias with the recipient phone number, wherein the exchange server is configured to:
receive a first wireless network messaging service message from the first wireless device, routed via the wireless network to the exchange server using the short code as the destination address, wherein:
(a) the first message contains content including at least some non-text content,
(b) the recipient alias is included in a body of the first message;
(c) a short code associated with the exchange server is included in a destination address field of a header of the first message, and
(d) the recipient phone number is not included in the first message;
retrieve the recipient alias from the first message;
retrieve the recipient phone number by performing a lookup of the record in the database based on the recipient alias;
allocate one of a plurality of long codes of the exchange server to the recipient;
save the allocated long code, an identifier associated with the sender and the recipient phone number in a long code record;
forward the first message from the exchange server, for delivery to the recipient through the wireless network, based on the recipient phone number as a destination address and using the allocated long code as a source address;
receive a second wireless network messaging service message from the second wireless device, routed via the wireless network to the exchange server using the allocated long code as the destination address of the second message, the second message being a reply to the first message; and
responsive to allocated long code as the destination address of the second message and using the long code record, forwarding the second message for delivery through the wireless network to the first wireless device.

* * * * *